United States Patent
Masuda

(10) Patent No.: US 10,122,144 B2
(45) Date of Patent: *Nov. 6, 2018

(54) SOLAR-PUMPED FIBER LASER DEVICE

(71) Applicant: TOYOTA JIDOSHA KABUSHIKI KAISHA, Toyota-shi, Aichi-ken (JP)

(72) Inventor: Taizo Masuda, Yokohama (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/813,689

(22) Filed: Nov. 15, 2017

(65) Prior Publication Data

US 2018/0145475 A1    May 24, 2018

(30) Foreign Application Priority Data

Nov. 21, 2016 (JP) ................. 2016-225792

(51) Int. Cl.
*H01S 3/0915* (2006.01)
*H01S 3/067* (2006.01)
*G02B 6/42* (2006.01)

(52) U.S. Cl.
CPC ........ *H01S 3/0915* (2013.01); *H01S 3/06704* (2013.01); *G02B 6/4298* (2013.01)

(58) Field of Classification Search
CPC .. H01S 3/06704; H01S 3/0915; H01S 3/0675; H01S 3/067; H01L 31/055
See application file for complete search history.

(56) References Cited

U.S. PATENT DOCUMENTS 6,697,409 B1*   2/2004   Sekiguchi ......... H01S 3/094003
                                                     372/32
2009/0314333 A1* 12/2009  Shepard ................... G02B 6/04
                                                     136/248

(Continued)

FOREIGN PATENT DOCUMENTS

JP         07-057525 A       3/1995
JP        2011-023377 A      2/2011

(Continued)

OTHER PUBLICATIONS

Yabe T. et al. "High-efficiency and economical solar-energy-pumped laser with Fresnel lens and chromium codoped laser medium", Applied Physics Letters 90, (2007), 261120-261120-3 (4 pagaes total).

(Continued)

*Primary Examiner* — Tuan Nguyen
(74) *Attorney, Agent, or Firm* — Sughrue Mion, PLLC

(57) ABSTRACT

Provided is a solar-pumped fiber laser device that includes: a first layer of a light guiding material or a fluorescent material having a circular or an elliptical planar contour with an even thickness; and an optical fiber wound around a peripheral thickness edge of the first layer, wherein the optical fiber is irradiated with light formed of solar light having entered a flat surface of the planar contour of the first layer, the solar light being scattered by the light guiding material, or with fluorescence generated by applying the solar light having entered the flat surface of the planar contour of the first layer to the fluorescent material.

8 Claims, 4 Drawing Sheets

(56) References Cited

U.S. PATENT DOCUMENTS

2011/0110389 A1* 5/2011 Yoshida ............... H01S 3/0915
372/35
2017/0271836 A1* 9/2017 Masuda ............... H01S 3/0915

FOREIGN PATENT DOCUMENTS

| JP | 2013235930 A | 11/2013 |
| JP | 2015201464 A | 11/2015 |

OTHER PUBLICATIONS

Philip D. Reusswig et al. "A path to practical Solar Pumped Lasers via Radiative Energy Transfer", Scientific Reports 5, Article No. 14758 May 27, 2015 (12 pages total).
An Office Action dated Jan. 18, 2018, which issued during the prosecution of U.S. Appl. No. 15/458,539.
Yabe T. et al. "High-efficiency and economical solar-energy-pumped laser with Fresnel lens and chromium codoped laser medium", Applied Physics Letters 90, (2007), 261120-261120-3 (4 pages total).
Notice of Allowance dated Jun. 6, 2018, which issued during the prosecution of U.S. Appl. No. 15/458,539.

\* cited by examiner

FIG. 3
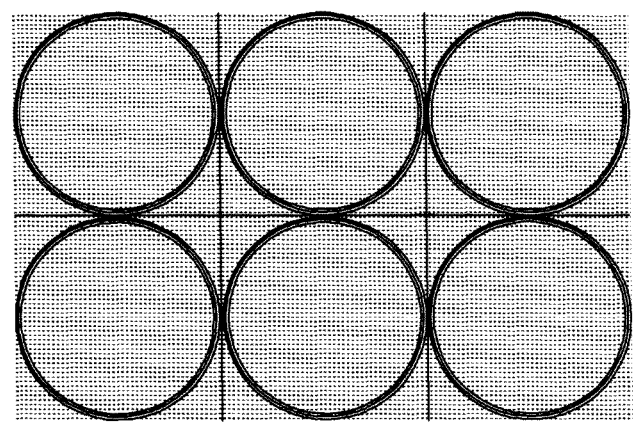
FIG. 4A     FIG. 4B     FIG. 4C
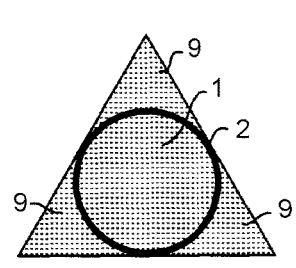 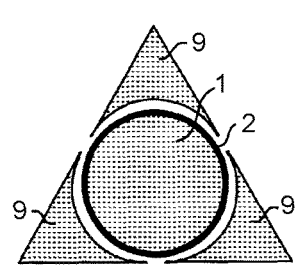 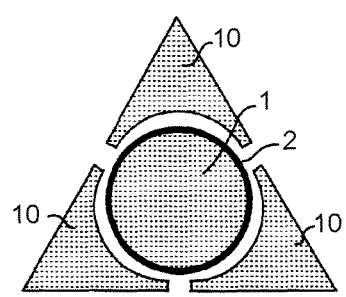

FIG. 7A
FIG. 7B
FIG. 7C
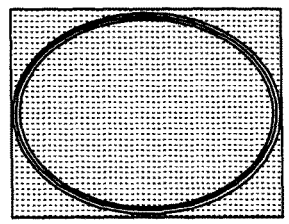
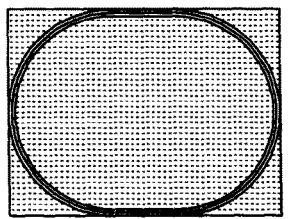
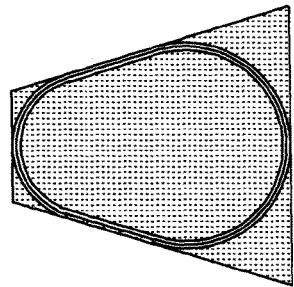
FIG. 8
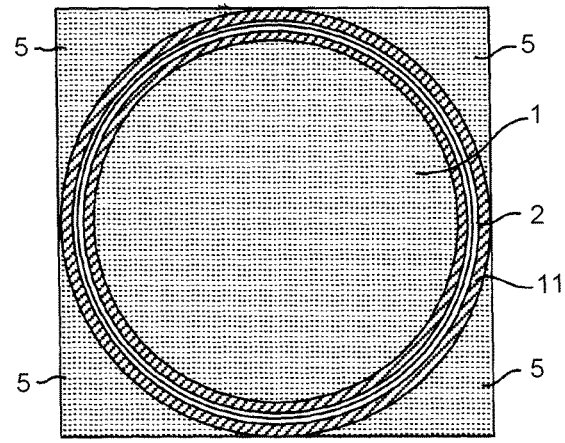

SOLAR-PUMPED FIBER LASER DEVICE

INCORPORATION BY REFERENCE

The disclosure of Japanese Patent Application No. 2016-225792 filed on Nov. 21, 2016 including the specification, drawings and abstract is incorporated herein by reference in its entirety.

BACKGROUND

1. Technical Field

The present disclosure relates to a solar-pumped fiber laser device that is excited by solar light so as to generate a laser in an optical fiber.

2. Description of Related Art

An optical fiber containing rare earth elements that is irradiated with solar light or fluorescence generated by irradiating a fluorescent material with solar light so as to excite a laser light having a particular wavelength in the optical fiber has been known. When an optical fiber of this type is bent with a curvature greater than a certain moderate curvature, an optical guiding property becomes deteriorated, and further increase in curvature might cause breakage to this optical fiber. Hence, in a laser device that exposes an optical fiber to irradiation light, the optical fiber is formed into a straight line or a substantially straight line; or the optical fiber is formed into a U-shape formed by providing partial moderate bending to the linear arrangement, as described in the following Japanese Patent Application Publication No. 7-57525. Hence, in order to expose the optical fiber having a required length relative to a flux of parallel rays like solar light, it is required for the laser device to have a length dimension equivalent to a length required for the optical fiber (or a little less than half this length).

SUMMARY

The present disclosure provides a solar-pumped fiber laser device capable of exposing an optical fiber with a certain required length to solar light in a space greatly reduced relative to this required length.

The present disclosure proposes a solar-pumped fiber laser device characterized by including: a layer of a light guiding material or a fluorescent material having a circular or an elliptical planar contour with an even thickness; and an optical fiber wound around a peripheral thickness edge of the layer, wherein the optical fiber wound around the peripheral thickness edge is irradiated with light formed of solar light having entered a flat surface of the planar contour of the layer, the solar light being scattered by the light guiding material, or with fluorescence generated by applying the solar light having entered the flat surface of the planar contour of the layer to the fluorescent material. Herein, the "elliptical shape" may denote a shape having a smooth contour with a curvature of not more than a predetermined value, such as an oval shape, a shape formed by connecting semi-circular arcs with the same diameters by two parallel straight lines, and a shape formed by connecting substantially semi-circular arcs with different diameters by two non-parallel straight lines, as shown in FIG. 7A, FIG. 7B, and FIG. 7C.

An additional layer of the light guiding material or the fluorescent material may be added around an outer circumference of a ring of the optical fiber wound around the peripheral thickness edge of the layer so as to configure an entire planar outer contour of the solar-pumped fiber laser device to be polygonal. This additional layer may be appropriately divided.

The optical fiber wound around the peripheral thickness edge of the layer may be covered by a layer of a transparent material having a higher refractive index than that of the light guiding material or the fluorescent material.

As described above, in the case in which the solar-pumped fiber laser device has a structure that includes: the layer of a light guiding material or a fluorescent material having a circular or an elliptical planar contour with an even thickness; and the optical fiber wound around the peripheral thickness edge of the layer, the curvature of the circular planar contour of the layer or the maximum curvature of the elliptical planar contour of the layer is designed to be not more than a curvature acceptable for bending of the optical fiber, to thereby configure the solar-pumped fiber laser device within length and breadth dimensions greatly reduced relative to a whole length of the optical fiber. In this case, the solar light having entered the surface in a circular shape or an elliptical shape of the layer having a circular or an elliptical planar contour, as the light scattered by the light guiding material or as the fluorescence generated by applying the solar light to the fluorescent material, is applied to the optical fiber wound around the circumference thickness edge of the layer.

By adding the additional layer of the light guiding material or the fluorescent material around the outer circumference of the ring of the optical fiber wound around the peripheral thickness edge of the above layer so as to configure the entire planner outer contour of the solar-pumped fiber laser device to be polygonal, the solar light applied to this additional layer or the fluorescence excited by this can be applied to the wound body of the optical fiber from the outside of the ring thereof; thus received light from the solar light relative to the optical fiber is increased by this. In this case, the additional layer added to the outer circumference of the ring of the optical fiber expands the circular or elliptical planar contour of the layer of the light guiding material or the fluorescent material while the overall length and breadth dimensions of the solar-pumped fiber laser device is maintained to be the original one. Accordingly, the laser output of the solar-pumped fiber laser device per unit is increased by the additional layer while the overall length and breadth dimensions of the solar-pumped fiber laser device is maintained to be the original one. In addition to this, since polygons can be assembled with no gaps therebetween, when a plurality of units are assembled in order to increase the output of the solar-pumped fiber laser device, it is possible to completely absorb the solar light applied within the outer contour of the whole device. If such a layer is appropriately divided, addition of the additional layer becomes easier.

If the optical fiber wound around the peripheral thickness edge of the above layer is covered by the transparent material having a higher refractive index than that of the light guiding material or the fluorescent material, the light having entered the layer of the transparent material from the layer of the light guiding material or the fluorescent material becomes more difficult to exit the layer of the transparent material due to the relation of both refractive indexes, and thus the light is absorbed by the optical fiber with a higher efficiency.

The solar-pumped fiber laser device may be configured to be a unit, and a plurality of units may be assembled.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a plan view showing one example in a manner of configuring the solar-pumped fiber laser device as shown in FIG. 2A to be a single unit, and assembling these units so as to increase an output of the whole device;

FIG. 4A is a plan view showing an embodiment example in which an optical fiber 2 is wound around the peripheral thickness edge of the layer 1 of the light guiding material or the fluorescent material having a circular planar contour with an even thickness, and furthermore, an additional layer 9 of the light guiding material or the fluorescent material is added around an outer circumference of the ring of the optical fiber so as to configure the entire planar outer contour of the solar-pumped fiber laser device to be triangle;

FIG. 4B is a plan view showing a state in which the additional layer 9 of FIG. 4A is set apart from a wound layer of the optical fiber 2;

FIG. 4C is a plan view showing an embodiment example in which the additional layer is changed as an additional layer 10;

FIG. 7A is a plan view showing an embodiment example in which the optical fiber is wound around the peripheral thickness edge of the layer of the light guiding material or the fluorescent material having an elliptical planar contour with an even thickness, and furthermore, an additional layer of the light guiding material or the fluorescent material is added around the outer circumference of the ring of the optical fiber so as to configure the entire planar outer contour of the solar-pumped fiber laser device to be polygonal, and FIG. 7A shows in the case in which the elliptical shape is an oval shape;

FIG. 7B is a plan view showing an embodiment example in which the optical fiber is wound around the peripheral thickness edge of the layer of the light guiding material or the fluorescent material having an elliptical planar contour with an even thickness, and furthermore, an additional layer of the light guiding material or the fluorescent material is added around the outer circumference of the ring of the optical fiber so as to configure the entire planar outer contour of the solar-pumped fiber laser device to be polygonal, and FIG. 7B shows the case in which the elliptical shape is formed by connecting semi-circular arcs with the same diameters by two parallel straight lines;

FIG. 7C is a plan view showing an embodiment example in which the optical fiber is wound around the peripheral thickness edge of the layer of the light guiding material or the fluorescent material having an elliptical planar contour with an even thickness, and furthermore, an additional layer of the light guiding material or the fluorescent material is added around the outer circumference of the ring of the optical fiber so as to configure the entire planar outer contour of the solar-pumped fiber laser device to be polygonal, and FIG. 7C shows the case in which the elliptical shape is formed by connecting substantially semi-circular arcs with different diameters by two non-parallel straight lines; and FIG. 8 is a plan view showing an embodiment example in which the optical fiber 2 of the embodiment example shown in FIG. 2A is further covered by a layer 11 made of a transparent material having a higher refractive index than that of the light guiding material or the fluorescent material composing the layer 1 and the additional layer 5 (note that the transparent material is shown in a plan sectional view).

DETAILED DESCRIPTION OF EMBODIMENTS

Figure 1A:
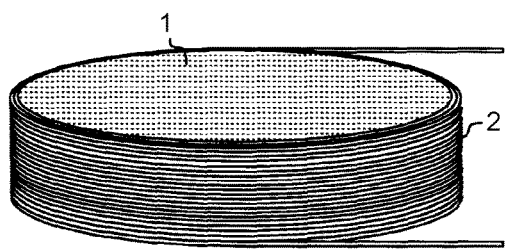
FIG. 1A is a perspective view showing a basic configuration part of a solar-pumped fiber laser device according to the present disclosure, the device configured in a manner of winding an optical fiber 2 around a circumference thickness edge of a layer 1 of a light guiding material or a fluorescent material having a circular planar contour with an even thickness.
Figure 1B:
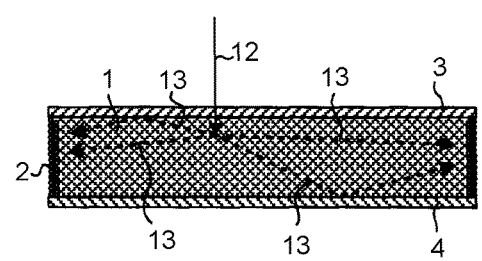
FIG. 1B is a longitudinal sectional view of a structural body to which transparent plates for covering 3, 4 are added to the structural body shown in FIG. 1A.

A solar-pumped fiber laser device according to the present disclosure includes: as a basic configuration, a layer 1 formed of an optical guiding material or a fluorescent material having a circular or an elliptical (circular in this example) planar contour with an even thickness as shown in FIG. 1A; and an optical fiber 2 wound around a peripheral thickness edge of the layer, and more specifically, as shown in FIG. 1B, the solar-pumped fiber laser device has a structure further including transparent plates for covering 3, 4 in addition to the above configuration. Note that an inner side of the transparent plate 4 located at the bottom may be a surface with a high reflectance, such as a mirror surface. It is configured that the optical fiber 2 wound around the peripheral thickness edge is irradiated with light formed of solar light 12 having entered a flat surface of the circular or elliptical planar contour of the layer 1, the solar light being scattered by the light guiding material composing the layer 1, or with fluorescence generated by applying the solar light having entered the flat surface to the fluorescent material composing the layer 1, as indicated by light 13.

An additional layer 5 to 8 formed of the light guiding material or the fluorescent material as shown in FIG. 2A to FIG. 2E is further added to the basic configuration as shown in FIG. 1A and FIG. 2 so as to configure the solar-pumped fiber laser device to be a single unit exhibiting a polygonal (rectangular in this case) outer contour as a whole. Each additional layer 5 to 8 of the light guiding material or the fluorescent material may appropriately be divided into layer pieces as shown in FIG. 2A to FIG. 2E. The solar light having entered such an additional layer is scattered by the light guiding material in the additional layer, or excites the fluorescent material in the additional layer; and the solar light scattered by the light guiding material or the fluorescent material generated by the fluorescent material is applied to the wound layer of the optical fiber 2 from an outer circumference of the ring of the optical fiber. By adding the above described additional layer to the outer circumference of the ring of the optical fiber, the circular or elliptical planar contour of the layer of the light guiding material or the fluorescent material is expanded into a polygonal shape while the length and breadth dimensions of the solar-pumped fiber laser device are maintained to be original ones. Hence, the output of the solar-pumped fiber laser device by one unit is increased by the additional layer while the entire length and breadth dimensions of the solar-pumped fiber laser device are maintained to be the original ones.

Figure 2A:
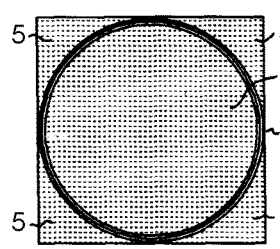
FIG. 2A is a plan view showing an embodiment example in which the optical fiber 2 is wound around the peripheral thickness edge of the layer 1 of the light guiding material or the fluorescent material having a circular planar contour and an even thickness; furthermore, an additional layer 5 of the light guiding material or the fluorescent material is added around an outer circumference of a ring of the optical fiber so as to configure an entire planar outer contour of the solar-pumped fiber laser device to be polygonal (square in this case)
Figure 2B:
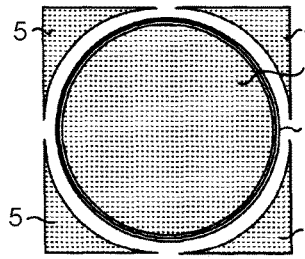
FIG. 2B is a plan view showing a state in which the additional layer 5 of FIG. 2A is set apart from a wound layer of the optical fiber 2.
Figure 2C:
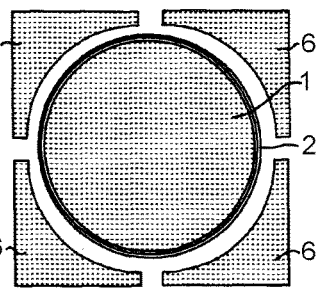
FIG. 2C is a plan view showing an embodiment example in which the additional layer is changed as an additional layer 6.
Figure 2D:
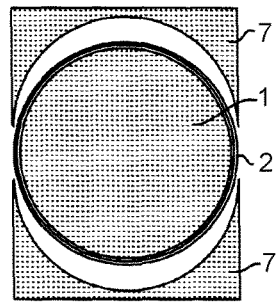
FIG. 2D is a plan view showing an embodiment example in which the additional layer is changed as an additional layer 7.
Figure 2E:
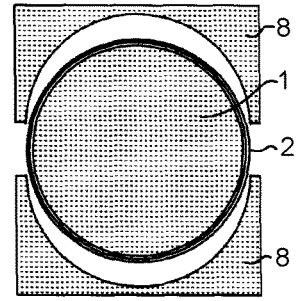
FIG. 2E is a plan view showing an embodiment example in which the additional layer is changed as an additional layer 8.

When the solar-pumped fiber laser device as indicated in FIG. 2A is used alone, in order to prevent the solar light scattered in the additional layer or the fluorescence generated in the additional layer from leaking out of the device, a plate body having a high reflectance such as a mirror may be provided to the circumference of the polygonal outer contour in addition to the bottom surface thereof. However, practically, in many cases, in order to increase the output of the solar-pumped fiber laser device, a plurality of solar-pumped fiber laser devices, each shown in FIG. 2A, may be assembled and used, as shown in an example of FIG. 3. In such a case, circumferences of the adjacent units may be opened as they are. In this case, if each unit has a polygonal outer contour as described in the present disclosure, there is no gap between each two adjacent units, to thus effectively receive all the solar light applied within the outer contour of the entire unit assembly.

FIG. 4A to FIG. 4C show embodiment examples in each of which the optical fiber 2 is wound around the peripheral thickness edge of the layer 1 of the light guiding material or the fluorescent material having a circular planar contour with an even thickness, and the additional layer is added to the circumference thereof so as to configure the entire planar outer contour is configured to be triangle. Also in this case, as indicated as the additional layer 9 or 10, the additional layer may be divided into layer pieces.

Figure 5:
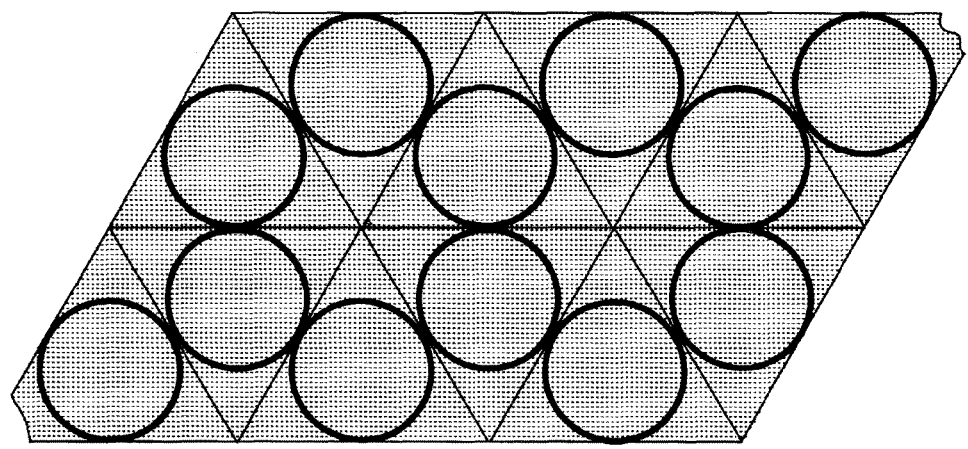
FIG. 5 is a plan view showing one example in a manner of configuring the solar-pumped fiber laser device shown in FIG. 4A as a single unit, and assembling these units so as to increase the output of the devices.
Figure 6:
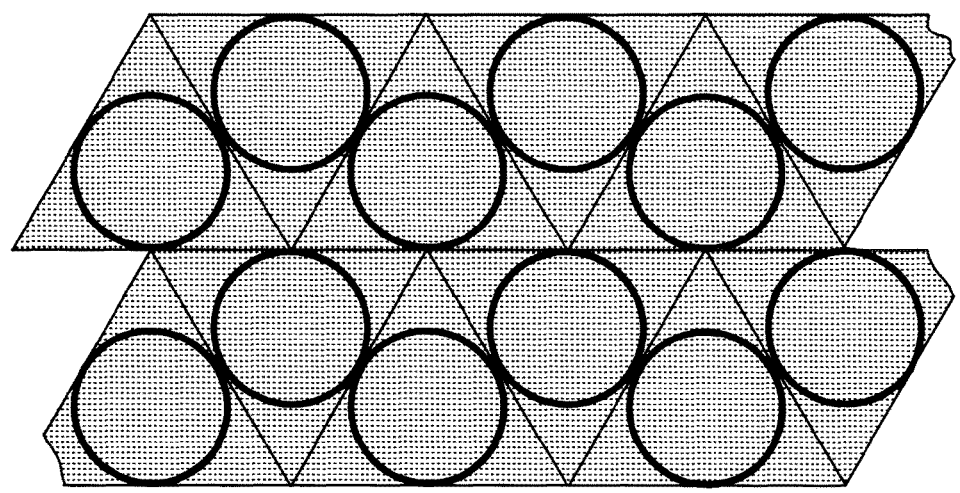
FIG. 6 is a plan view showing another example in a manner of configuring the solar-pumped fiber laser device shown in FIG. 4A as a single unit, and assembling these units so as to increase the output of the whole device.

In order to assemble the units as shown in FIG. 4A so as to form the solar-pumped fiber laser device having a greater output, this assembly may be carried out in a manner as shown in examples of FIG. 5 or FIG. 6.

Each of FIG. 7A to FIG. 7C shows a manner of configuring the planar contour of the layer of the light guiding material or the fluorescent material to be elliptical, instead of using the layer of the light guiding material or the fluorescent material having a circular contour. As already described, the elliptical shape in this case may include an oval shape as shown in FIG. 7A, a shape formed by connecting semi-circular arcs with the same diameters by two parallel straight lines as shown in FIG. 7B, and a shape formed by connecting substantially semi-circular arcs with different diameters by two non-parallel straight lines as shown in FIG. 7C; and although not shown in the drawings, the elliptical shape may include a shape having a smooth contour with a curvature of not more than a predetermined value for the same purpose. It is also possible to completely receive the solar light applied within the outer contour of the entire unit assembly, by using each of the above outer contours.

FIG. 8 shows an embodiment example in which the optical fiber 2 of the embodiment example shown in FIG. 2A is covered by a layer 11 made of a transparent material having a higher refractive index than that of the light guiding material or the fluorescent material composing the layer 1 and the additional layer 5. If the wound body of the optical fiber 2 is covered by the layer 11 of a transparent material having a higher refractive index than that of the light guiding material or the fluorescent material composing the layer 1 and the additional layer 5, the light having entered the inside of the layer 11 of the transparent material from the layer 1 and the additional layer 5 of the light guiding material or the fluorescent material becomes more difficult to exit the transparent layer due to the relation of both refractive indexes, and thus the light is absorbed by the optical fiber with a higher efficiency.

In the above description, the present disclosure has been explained in detail using several embodiment examples, but it will be apparent to those skilled in the art that various modifications and variations can be made to the above embodiment examples within the scope of the present disclosure.

What is claimed is:

1. A solar-pumped fiber laser device comprising:
   a first layer of a light guiding material or a fluorescent material, the first layer having a circular or an elliptical planar contour with an even thickness; and
   an optical fiber wound around a peripheral thickness edge of the first layer,
   wherein
   the optical fiber wound around the peripheral thickness edge is irradiated with light formed of solar light having entered a flat surface of the planar contour of the first layer, the solar light being scattered by the light guiding material, or with fluorescence generated by applying the solar light having entered the flat surface of the planar contour of the first layer to the fluorescent material.

2. The solar-pumped fiber laser device according to claim 1, wherein
   an additional layer of the light guiding material or the fluorescent material is added around an outer circumference of a ring of the optical fiber wound around the peripheral thickness edge of the first layer so as to configure an entire planar outer contour of the solar-pumped fiber laser device to be polygonal.

3. The solar-pumped fiber laser device according to claim 2, wherein
   the optical fiber wound around the peripheral thickness edge of the first layer is covered by a second layer of a transparent material having a higher refractive index than a refractive index of the light guiding material or a refractive index of the fluorescent material.

4. The solar-pumped fiber laser device according to claim 2, wherein
   the additional layer is the light guiding material.

5. The solar-pumped fiber laser device according to claim 2, wherein
   the additional layer is the fluorescent material.

6. The solar-pumped fiber laser device according to claim 2, wherein the solar-pumped fiber laser device is configured to be a unit, and a plurality of units are assembled.

7. The solar-pumped fiber laser device according to claim 1, wherein
the first layer is the light guiding material.

8. The solar-pumped fiber laser device according to claim 1, wherein
the first layer is the fluorescent material.

* * * * *